United States Patent [19]
Vertanen et al.

[11] Patent Number: 5,803,115
[45] Date of Patent: Sep. 8, 1998

[54] VALVE FOR RELIEVING PRESSURE AND VACUUM CONDITIONS IN A TANK

[75] Inventors: Mark W. Vertanen; David D. Riley; Matthew T. Higgins, all of Creston, Iowa

[73] Assignee: Gits Manufacturing Company, Creston, Iowa

[21] Appl. No.: 918,366

[22] Filed: Aug. 26, 1997

[51] Int. Cl.⁶ ........................................... F16K 17/26
[52] U.S. Cl. ...................... 137/493.9; 137/493.2
[58] Field of Search ............................... 137/493.9, 493.2, 137/493.6

[56] References Cited

U.S. PATENT DOCUMENTS

| | | | |
|---|---|---|---|
| 4,040,404 | 8/1977 | Tagawa | 137/493.2 |
| 5,165,445 | 11/1992 | Vertanen | 137/493.9 |
| 5,347,813 | 9/1994 | Yanagi et al. | 137/493.9 |
| 5,449,018 | 9/1995 | Harris | 137/493.9 |
| 5,479,978 | 1/1996 | Zenkich et al. | 137/493.3 |
| 5,494,069 | 2/1996 | Bergmann | 137/493.2 |
| 5,499,654 | 3/1996 | Shefte | 137/493.9 |
| 5,623,958 | 4/1997 | Bumpers | 137/493.9 |

*Primary Examiner*—Denise L. Ferensic
*Assistant Examiner*—Joanne Y. Kim
*Attorney, Agent, or Firm*—Zarley, McKee, Thomte, Voorhees & Sease

[57] ABSTRACT

A combination valve for relieving pressure and vacuum conditions in a pressurizable tank includes an elongated rod with a spring seat thereon, a body member sealingly securable to the tank, a cover member secured for axial movement with the rod, a spring mounted between the body member and rod so as to yieldably urge the rod and cover member toward the body member, and an O-ring rollably disposed in a groove in the body member. The width of the O-ring is substantially less than the width of the groove such that the O-ring is rollable within the groove between the body member and the cover member. A seal member mounts on the rod and extends between the cavity and the cover member so as to normally sealingly engage the cover member and cover the vent. In a vacuum venting mode, the flexible seal member is suctioned away from the cover member and the vents therein in response to a predetermined vacuum present in the tank. The air can then be drawn into the tank through the vent. In a pressure relieving mode, the pressure in the tank overcomes the force of the spring so as to move the cover member upwardly with respect to the body member. This relative movement causes the O-ring to roll upwardly and eventually stop on an upper shoulder of the groove. Thereafter, movement of the cover member relative to the body member causes the cover member to slide past the O-ring and open an annular pressure relieving passage between the cover member and the O-ring.

21 Claims, 3 Drawing Sheets

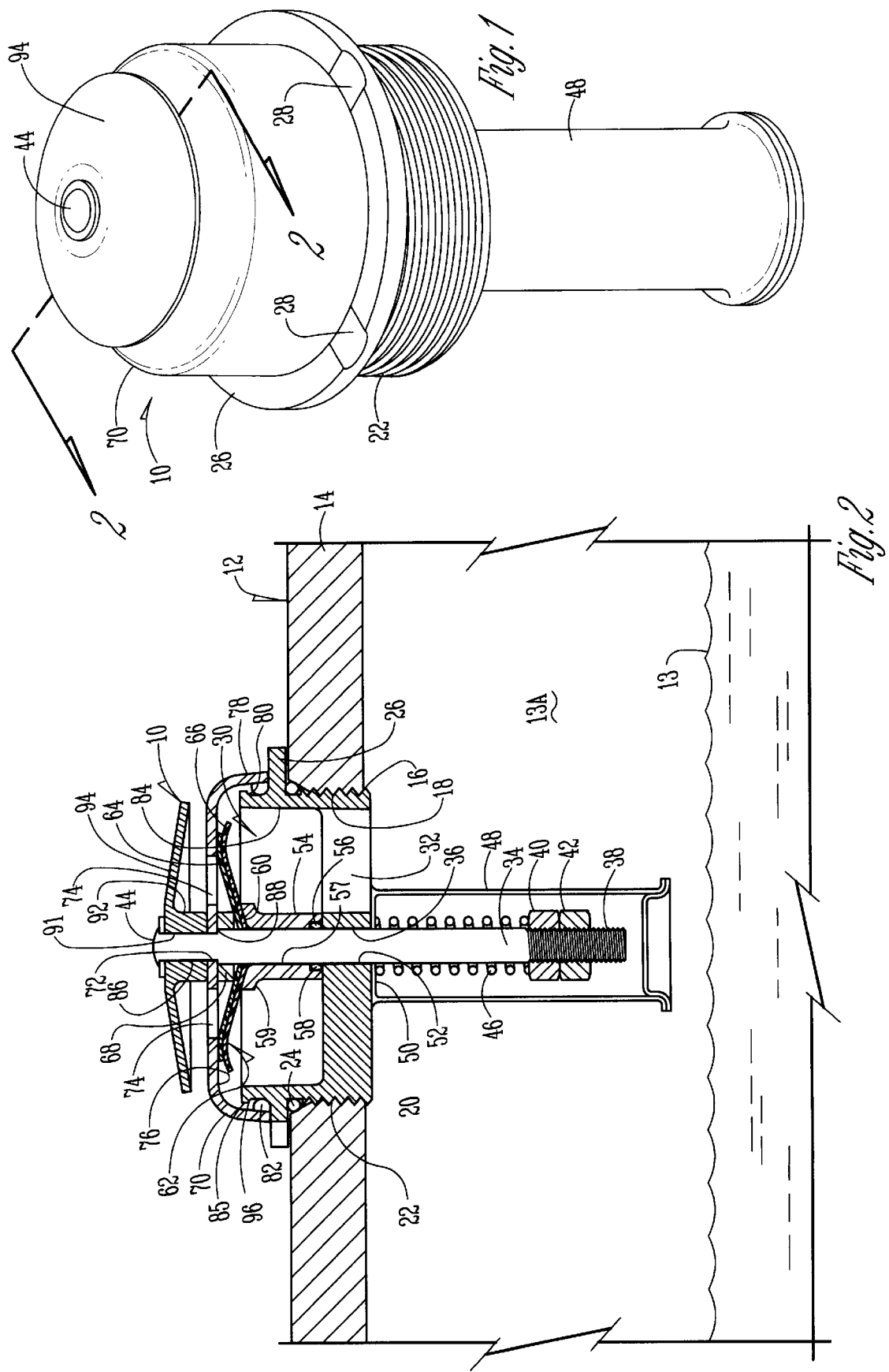

VALVE FOR RELIEVING PRESSURE AND VACUUM CONDITIONS IN A TANK

BACKGROUND OF THE INVENTION

1. Field of the Invention

The present invention relates to the field of valves for pressurized tanks, storage and cargo containers and the like. More particularly, the present invention relates to a relief valve for relieving the pressure from such tanks. The relief valve of this invention can be incorporated into a combination or two-in-one valve for relieving pressure and venting vacuum from said tanks through a single port. This invention is particularly useful on intermediate bulk containers (IBC) commonly used for storage and shipment of various goods, including chemicals.

2. Problems in the Art

Some chemicals are stored in tanks with a pressurized nitrogen gas blanket isolating the chemicals within a certain area of the tank. The tanks are available in a variety of shapes such as cylindrical, round, square and rectangular. The rectilinear tanks are particularly susceptible to collapse and explosion because of their shapes. Thus, it is a common practice in the industry to provide 4'×4'×4' metal tanks with relief valves set to open at 5.0 pounds per square inch (psi) and provide 4'×4'×4' plastic tanks with valves set to open at 15 psi. In an emergency, it is desirable for the relief valve to allow as much fluid/gas as possible to escape, thereby avoiding overpressurization of the tank. In normal operation, the relief valve should regulate the pressure in the tank between the relief pressure setting and 80% of the relief pressure setting.

Most conventional pressure relief valves have a sealing member that is spring biased to cover or surround a valve opening. This type of pressure relief valve uses the spring load to hold the sealing member in sealing relation with the valve opening until the pressure is sufficient to deflect the spring. The sealing member comprises a face sealing flat gasket, a face sealing O-ring on a flat surface, or a diameter sealing O-ring statically disposed within a tightly constraining groove. The sealing member sealingly engages the area around the valve opening. The clearance between the sealing portion of the sealing member and the sealing surface surrounding the valve opening is negligible. Therefore, as soon as the spring is compressed or deflected, the relief valve is opened.

To achieve the above-mentioned pressure relief settings, seals with flat sealing faces are sometimes used with springs having very high spring rates. These higher spring rates do not allow the relief valve to open very far once the release or relief pressure is met. Thus, flow through the valve is limited. Springs with a lower spring rate allow the pressure valve to open farther, thus increasing the flow through the relief valve for a given size of valve opening. However, if the spring rate is too low, the valve will not seal effectively and will open at a low enough pressure. Thus, low spring rate springs, large effective valve opening areas, and maximum relief flow are common design objectives for pressure relief valves. However, balancing these objectives has been difficult in conventional valves.

Vacuum relief or venting has typically been provided by a separate device which is installed in a separate port in the container. Thus, two orifices or ports must be made available in the container device for mounting the separate pressure and vacuum relief devices. The vacuum relief valve opens at a predetermined or set negative pressure or vacuum condition at a relatively high flow rate. Make up air is allowed to enter the container so as to prevent the collapse or implosion of the container during various operations such as the transfer or storage of product, including filling and emptying the container.

Valves combining the vacuum and pressure relief functions in a single container orifice typically utilize a manifold or Y-shape adapter for mounting the respective valves. Other combination pressure and vacuum relief valves, such as the one disclosed in U.S. Pat. No. 5,165,445 issued to Vertanen, utilize a single port in the tank. However, such valves are relatively complex.

FEATURES OF THE INVENTION

Compared to the relatively limited devices and alternatives discussed above, the present invention relates to a precise, high flow rate, and reliable pressure and vacuum relief valve for relieving excess pressure and vacuum conditions in a storage tank or similar container.

Therefore, a primary objective of the present invention is the provision of a combination valve for relieving pressure and vacuum conditions in a tank.

Another objective of the present invention is the provision of a pressure and vacuum relief valve which can utilize a relatively low spring rate spring.

Another objective of the present invention is the provision of a pressure and vacuum relief valve which has large effective valve openings.

Another objective of the present invention is the provision of a pressure and vacuum relief valve which delays opening during an initial deflection of its spring.

Another objective of the present invention is the provision of a pressure and vacuum relief valve in which the spring is allowed to deflect and the relief valve is allowed to pressurize fully to the relief setting before the relief valve opens.

Another objective of the present invention is the provision of a pressure and vacuum relief valve having variable clearance between the sealing member and the sealed surface as the valve opens.

Another objective of the present invention is the provision of a pressure and vacuum venting valve having a cap adjacent the vent openings for preventing dirt, dust, and moisture from entering the vent openings and does not restrict the vacuum relieving flow through the vent openings.

A further objective of the present invention is the provision of a pressure relief valve having a rolling O-ring.

A further objective of the present invention is the provision of a spring-operated valve for a tank wherein the spring is enclosed in a protective impermeable sleeve or tube.

A further objective of the present invention is the provision of an improved combination valve for relieving pressure and vacuum conditions from a tank through a single port without costly manifold or Y-shaped structures.

Another objective of the present invention is the provision of a combination pressure and vacuum valve which is accurate, reliable, uncomplicated, economical to produce, and durable in use.

These and other objectives will be apparent from the drawings, and the description and claims which follow.

SUMMARY OF THE INVENTION

The present invention relates to a combination pressure and vacuum relief valve for relieving pressure and vacuum conditions in a tank. The combination valve for relieving pressure and vacuum conditions in a pressurizable tank includes a body member sealingly mounted in the tank and having a central bore in which an elongated rod is slidably mounted in, a cover member secured for axial movement with the rod and disposed adjacent the groove and having a vent opening, a spring mounted between the body member and rod so as to yieldably urge the rod and cover member toward the body member, and an O-ring rollably disposed in the groove in the body member and between the body member and the cover member. The width of the O-ring is substantially less than the width of the groove such that the O-ring is rollable within the groove. A resiliently flexible baffle member mounts on the rod and extends between the cavity and the vent opening in the cover member so as to normally sealingly engage the cover member and cover the vent opening.

In a vacuum venting mode, the baffle member is deflectable away from the cover member and the vent therein in response to a vacuum present in the tank. The air can then be drawn into the tank through the vent. In a pressure relieving mode, the pressure in the tank overcomes the force of the spring so as to move the cover member upwardly with respect to the body member. This relative movement causes the O-ring to roll upwardly and eventually stop on an upper shoulder of the groove. Thereafter, the cover member slides over the O-ring and eventually opens an annular pressure relieving passage between the cover member and the O-ring.

A valve for performing only the pressure relief function can easily be made by eliminating the vent and the associate sealing structures. Thus, the present invention flexibly accomplishes one or both functions as needed.

BRIEF DESCRIPTION OF THE DRAWINGS

FIG. 1 is a perspective view of the valve of this invention.

FIG. 2 is a sectional view of the valve of this invention taken along line 2—2 in FIG. 1, with the valve mounted in a tank, and showing the valve in a normal sealing mode.

DETAILED DESCRIPTION OF THE PREFERRED EMBODIMENT

Figure 3:
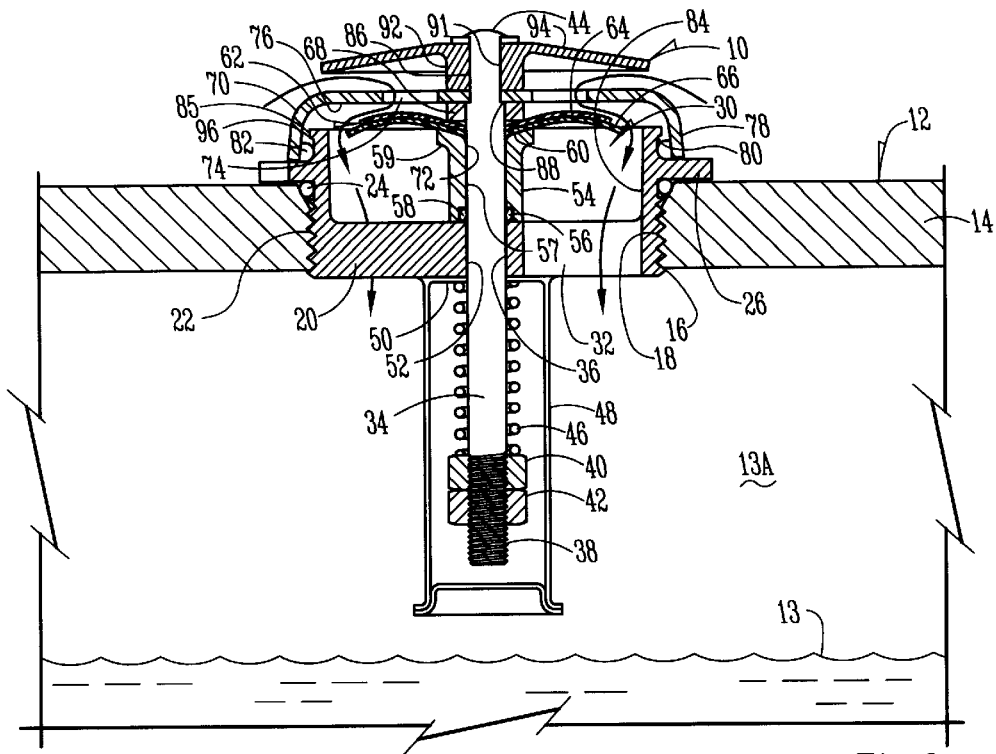
FIG. 3 is a sectional view similar to FIG. 2, showing the position of the valve in a vacuum venting mode and the corresponding fluid flow.

The valve of the present invention is generally denoted in the drawings by the reference numeral 10. FIG. 1 shows the valve 10 in an assembled state prior to installation.

FIG. 2 shows the valve 10 mounted in a tank 12 containing a pressurized fluid 13 and an optional nitrogen blanket 13A. As it is used herein, the term fluid includes a liquid, a gas, or some combination thereof. A wall 14 encloses the fluid 13 in the tank 12 and includes a port 16 therethrough having internal threads 18.

A body member 20 of the valve 10 extends through the port 16 and has external threads 22 thereon which matingly engage the threads 18 of the tank wall 14. National pipe threads (fine-NPTF) 18, 22 are preferred to sealingly attach the valve 10 to the wall 14 of the tank 12 with the aid of an O-ring 24.

The body member 20 has a cylindrical, substantially tubular shape. The body member 20 is rigid and formed of a strong, corrosion-resistant material such as stainless steel. A flange 26 protrudes outwardly from the body member 20 and includes a plurality of wrench engaging surfaces 28 formed thereon (see FIG. 1). Thus, a conventional spanner wrench (not shown) can be applied to the wrench engaging surfaces 28 in order to turn the valve 10 for installation or removal. A cavity 30 is formed inside the body member 20. One or more passages 32 provide fluid communication between the cavity 30 and the interior of the tank 12.

A rod 34 slidably extends in a generally vertical direction through a central bore 36 in the body member 20. The lower end of the rod 34 extends into the tank 12 and has external threads 38 thereon for threadably receiving a pair of jam nuts 40, 42. The upper end of the rod 34 includes a radially protruding head 44 thereon. The jam nut 40 engages a spring 46 which is interposed between the body member 20 and the rod 34. The spring 46 is of the coil compression type and has an inner diameter large enough to slidably receive the rod 34 and has an outside diameter which is less than the width of the jam nuts 40, 42. The spring rate of the spring 46 is preferably relatively low compared to the spring rates of conventional relief valves designed to relieve at 5 psi.

Because some of the fluids 13 which may be stored in the tank 12 can only come in contact with plastics, the lower end of the rod 34, including the spring 46 and the jam nuts 40, 42, can be enclosed or encased by an impermeable sleeve 48 made of polyethylene or other suitable nonreactive material. The upper portion 50 of the sleeve 48 is attached to the bottom of the body member 20 by interposition between the spring 46 and the body member 20. A hole 52 extends through the upper portion 50 so as to slidably accommodate the rod 34.

A spacer 54 is centrally disposed in the cavity 30 and slidably receives the rod 34 through a central bore 57. The lower surface of the spacer 54 includes an annular groove 56 in which an O-ring 58 is disposed to provide a seal between the spacer 54 and the rod 34. Thus, pressure from the cavity 30 cannot escape through the annular gap between the rod 34 and the central bore 57 of the spacer 54. The upper portion of the spacer 54 has a radially protruding flange 59 which extends substantially radially and outwardly from the main body of the spacer 54. The upper surface 60 of the spacer 54 has a generally conical concave shape for receiving and urging a resiliently flexible baffle or seal member 62 into a generally conforming conical or dished shape.

The seal member 62 can comprise a single member, but preferably includes first and second annular baffle members 64, 66 which are arranged in overlapping and abutting layers, as best seen in FIG. 2. The seal member 62 is mounted on the rod 34 and the central portion thereof is supported by the upper surface 60 of the spacer 54. A washer 68 spaces the central portion of the seal member 62 away from a cover member 70 which is secured on the rod 34 for axial movement therewith. The baffle members 64, 64 are preferably constructed of Buna N, Viton, or similar rubber-based compounds.

The outer diameter of the first (uppermost) baffle member 64 is less than the outer diameter of the second (lowermost) baffle member 66. Thus, the second baffle member 66 overhangs the outer periphery of the first baffle member 64. The second baffle member 66 is curved downwardly near its outer periphery and adjacent the outer periphery of the first baffle member 64. This provides additional support for the first baffle member 64 and directs additional concentrated sealing force on the outer periphery of the first baffle member 64.

The cover member 70 has a generally circular domed shape and includes a central bore 72 therein for receiving the rod 34. One or more vent openings 74 through the cover member 70 are equally spaced around the bore 72. Preferably the vent openings 74 comprise a plurality of kidney-shaped slots through the cover member 70 with ribs extending radially therebetween. The vent openings 74 lie radially inward of the seal member 62 so that the seal member 62 normally sealingly engages the underside 76 of the cover member 70.

The cover member 70 includes a peripheral flange 78 which extends downwardly so as to be disposed adjacent a groove 80 on the body member 70. An O-ring 82 is rollingly disposed between the underside 76 of the cover member 70 and the body member 20 at the groove 80. The O-ring 82 preferably has a circular cross section. For a 2.0 inch NPTF port valve, the preferred O-ring 82 is of the Viton type available from Dygert-Peck Co. under part number AS568 Size No. 138. It is contemplated that the groove 80, O-ring 82 and flange 78 can be located on the inside diameter 84 of the body member 20 without detracting from the invention, but location on the outside diameter 85 is preferred to maximize the area available for relief flow. The groove 80 is substantially wider than the cross-sectional diameter of the O-ring 82 so the O-ring can roll across the groove. In one embodiment of a two inch NPTF valve, the cross-sectional diameter of the O-ring 82 is approximately 0.094 or 3/32 of an inch and the width of the groove 80 is about 0.160 inch. Thus, the cross-sectional diameter of the O-ring 82 is less than sixty percent of the width of the groove 80.

The cover member 70 mounts on a reduced diameter portion 86 of the rod 34 adjacent a shoulder 88. A cap 90 having a central bore 91 for receiving the reduced diameter portion 86 of the rod 34 is interposed between the head 44 of the rod and the cover member 70. The cap 90 has a central hub portion 92 which does not obstruct the vent openings 74 of the cover member 70. The cap 90 also includes a shielding portion 94 which protrudes radially outward from the upper part of the central hub portion 92. The shielding portion 94 is therefore spaced above the cover member 70 and extends beyond the vent openings 74. Thus, dirt, dust, and other debris are discouraged from entering the vent openings 74 of the cover member 70. The space between the cover member 70 and the shielding portion 94 is sufficient to allow outside air to be drawn into the tank to relieve an undesirable vacuum condition therein, as described below.

In operation, the valve 10 is normally in a sealing state as shown in FIG. 2. FIG. 3 shows the vacuum relieving or venting mode of the valve 10. When the vacuum or negative pressure present in the tank 12 reaches a predetermined level, the suction acting downwardly on the seal member 62 moves the member 62 from its sealing engagement with the underside 76 of the cover member 70. Then, outside air, as indicated by the arrows in FIG. 3, is drawn into the tank 12 through the vent openings 74, cavity 30, and passage 32. Outside air will continue to be drawn into the tank until the vacuum or negative pressure is within the predetermined limits once again. The conical upper surface 60 of the spacer 54 and the resiliency of the member 62 encourage the member 62 to resume sealing engagement. In general, once the negative pressure or vacuum inside the tank 12 has been vented sufficiently to equalize the atmospheric pressure outside the tank 12, the member 62 will automatically spring back into sealing engagement with the cover member 70 to close the vent opening 74.

One advantageous feature of the present vacuum vent is that the effective opening for venting varies, i.e. increases or decreases portionally with the vacuum in the tank. A greater vacuum causes the rubber baffle members 64, 66 to peel back closer to the rod 34, thereby opening a larger effective vent opening. The converse is also true.

In the vacuum venting mode of the valve 10, there is no need for relative movement between the body member 20 and the cover member 70. The spring 46 is also inactive. Thus, it is contemplated that the valve 10 could be constructed without the spring 46 and without relative movement between the cover member 70 and the body member 20, without detracting from the vacuum venting mode of the valve 10.

Figure 4:
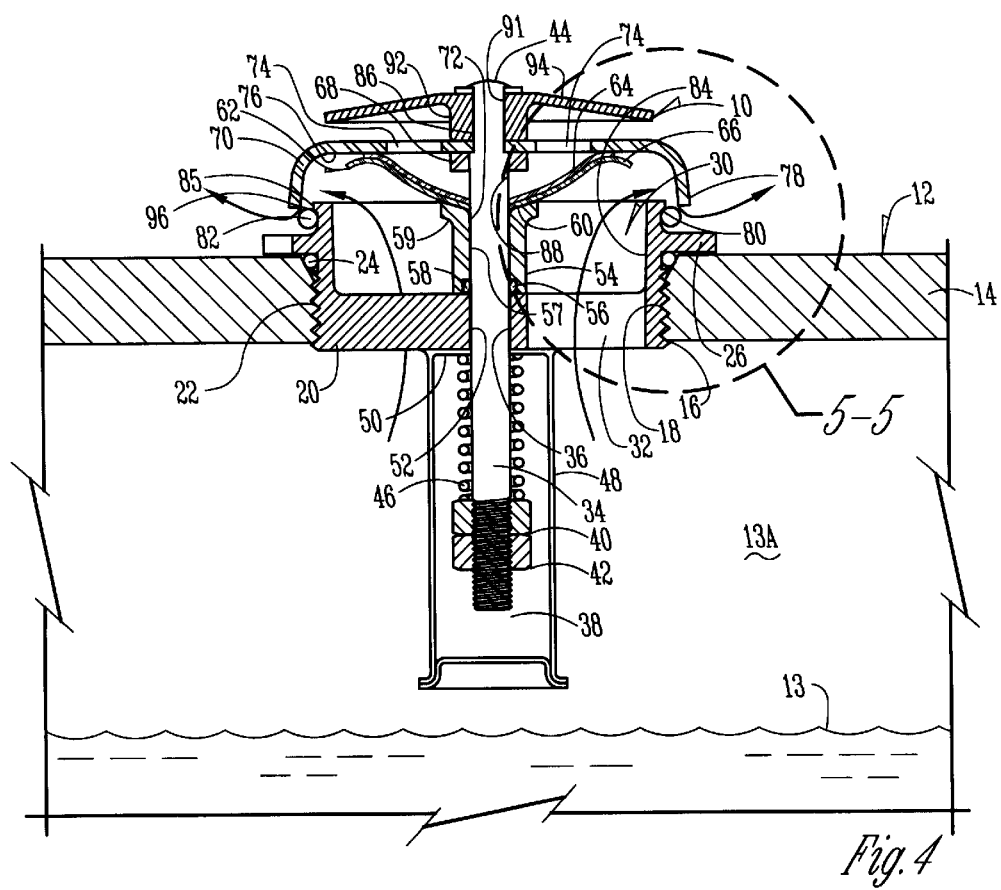
FIG. 4 is a sectional view similar to FIG. 2, showing the position of the valve in a pressure relieving mode and the corresponding fluid flow.
Figure 5:
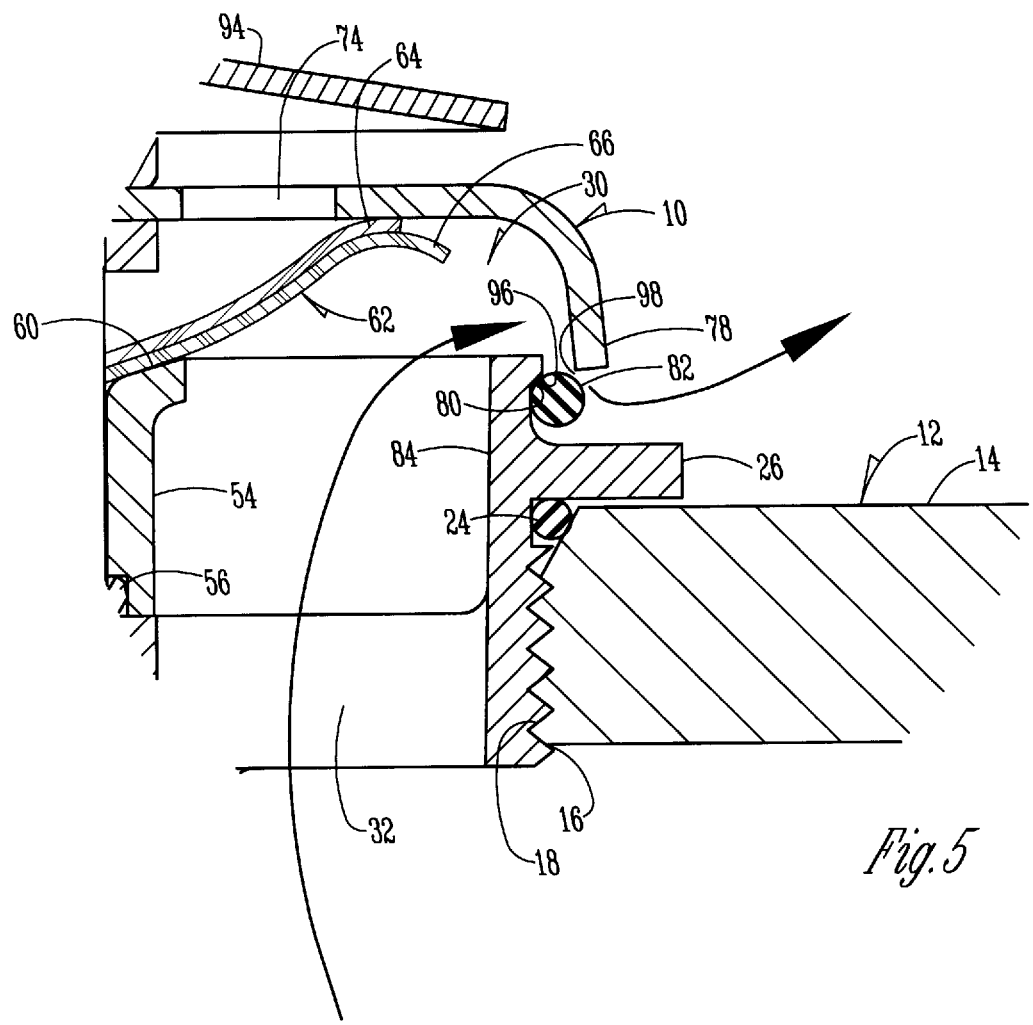
FIG. 5 is an enlarged partial sectional view of the area denoted by line 5—5 of FIG. 4.

FIGS. 4 and 5 illustrate the pressure relieving mode of the valve 10. When the pressure in the tank 12 and the cavity 30 is sufficient to overcome the force of the spring 46 and the rolling friction of the O-ring 82, the cover member 70 moves upwardly relative to the body member 20, thus compressing or deflecting the spring. As a result, there is relative movement between the body member 20 at the groove 80 and the underside 76 of the cover member 70 in response to the pressure inside the tank. Consequently, cover member 70 rolls the O-ring 82 upwardly until it abuts the upper end of the groove 80. The upper end or shoulder 96 of the groove 80 preferably has a radius at its base which is less than or equal to the radius of the O-ring 82.

Initial deflection of the spring occurs at about four psi in a five psi valve made according to the present invention. Thus, the valve continues to pressurize during the slight delay in which the O-ring traverses the groove 80. The spring 46 continues to deflect based on the pressure in the tank 12. The valve 10 gradually pressurizes until the O-ring 82 abuts the shoulder 96 of the groove 80 and stops. Then, as the cover member 70 continues to move upward, it slides across the stationary O-ring 82 at the top of groove 80. Sealing engagement is still maintained. Eventually the cover member 70 loses sealing engagement with the O-ring 82 as shown in FIG. 5. The resulting annular passage 98 allows pressure to escape between the cover member 70 and the O-ring 82.

The size of the groove 80 and O-ring 82 rolling within it allow a low spring rate spring 46 to be utilized. Consequently, the cover member 70 can be raised higher against the bins of the lighter spring 46. The resulting annular passage 98 provides a large area through which the pressure in the tank 12 can quickly be relieved. The larger area accommodates greater flow. The greater relief flow of this valve reduces the likelihood that the tank 12 will explode due to overpressurization.

The gradual pressurization of the valve 10 as it approaches the desired relief pressure setting enables the valve to be accurately set. Several variables can be adjusted so that the cover member 70 arrives at the desired release point. The size of the O-ring 82, the cover member 70, and the groove 80; the rolling frictional characteristics of the O-ring 82 on the groove 80 and the cover member 70; the sliding frictional characteristics of the O-ring 82 on the cover member 70; and the characteristics of spring 46 are variables which the designer can control. Conventional disc-type face sealing pressure relief valves do not provide as many variables for adjusting the relief valve pressure setting. These conventional valves open immediately upon any deflection of the spring. This sensitivity, coupled with the lack of adjustment variables, make it difficult to set conventional face sealing valves. The valve 10 of this invention can easily be made so the spring 46 will begin to deflect at four psi in a metal tank 12 and the valve 10 will relieve at five psi.

In FIG. 4, the vacuum vent 74 of the cover 70 in the valve 10 remained in a closed position. Therefore, it is contemplated that the valve 10 could be constructed to operate in a pressure relief mode only. However, the valve 10 advantageously provides a combination valve which is capable of relieving pressure and vacuum conditions within a tank or cargo container.

Thus, it can be seen that the present invention at least accomplishes its stated objectives.

In the drawings and specification there has been set forth a preferred embodiment of the invention, and although specific terms are employed, these are used in a generic and descriptive sense only and not for purposed of limitation. Changes in the form and the proportion of parts, as well as in the substitution of equivalents, are contemplated as circumstances may suggest or render expedient without departing from the spirit or scope of the invention as further defined in the following claims.

What is claimed is:

1. A combination valve for relieving pressure and vacuum conditions existing inside from a pressurizable tank, comprising:
    a body member adapted to be sealably mounted in the tank, the body member having a central bore extending therethrough and an annular groove thereon;
    an elongated rod slidably mounted in the central bore of the body member;
    a cover member mounted on the rod for axial movement therewith and disposed over the body member adjacent the groove, the cover member including at least one vent opening;
    an O-ring rollably disposed and normally being in sealing engagement in the groove between the cover member and the body member;
    a spring mounted on the rod so as to yieldably urge the rod and the cover member toward the body member; and
    a resiliently flexible seal member mounted on the rod below the cover member, the seal member normally sealingly engaging the cover member to close the vent opening and being deflectable away from the cover member to open the vent opening in response to a predetermined vacuum condition in the tank such that air can be drawn through the vent opening into the tank;
    whereby when pressure in the tank results in a force on the cover member exceeding the force of the spring, the cover member moves upwardly relative to the body member which causes the O-ring to roll along the groove until stopped by a shoulder of the groove, further upward movement of the cover member causing the cover member to slide over the O-ring and eventually lose contact with the O-ring to form a passage therebetween for relieving the pressure in the tank.

2. The valve of claim 1 wherein the groove is formed on an outside surface of the body member.

3. The valve of claim 1 wherein an impermeable plastic sleeve surrounds the spring to isolate the spring from the fluid in the tank.

4. The valve of claim 1 wherein the body member has a generally hollow tubular shape.

5. The valve of claim 1 wherein the body member has an outside diameter which includes threads thereon for sealingly securing the body member to mating threads in a mounting hole through a wall of the tank.

6. The valve of claim 1 wherein the seal member comprises first and second annular flexible overlapping baffle members mounted on the rod, the first baffle member having an outer diameter and normally engaging the cover member radially outward of the vent and adjacent the outer diameter to seal the vent opening, the second baffle member having an outer diameter greater than the outer diameter of the first baffle member to facilitate sealing engagement of the first baffle member with the cover member.

7. The valve of claim 6 wherein the outer diameter of the second baffle member curves downwardly.

8. The valve of claim 1 further comprising a cap mounted to the rod adjacent the cover member, the cap extending over the vent opening and in spaced relation thereto so as to shield the vent opening and allow air flow therethrough.

9. The valve of claim 1 wherein the body member has an outwardly protruding flange thereon which includes wrench engaging members formed thereon.

10. The valve of claim 1 wherein the spring is a coil spring having an inner diameter for slidably receiving the rod.

11. The valve of claim 1 wherein the rod has a threaded lower end on which a nut is mounted to define a spring seat and adjustably engage an end of the spring to establish a pressure relief setting.

12. The valve of claim 1 further comprising a spacer bar interposed on the rod between the body member and the seal member, the spacer bar supporting a central portion of the seal member while a peripheral portion of the seal member overhangs the spacer bar and is unsupported thereby.

13. The valve of claim 1 wherein the cover member is concave and has a central portion which extends transversely with respect to the body member and has a downwardly extending outer peripheral flange.

14. The valve of claim 1 wherein the groove has a width and the cross-sectional diameter of the O-ring is less than seventy-five percent of the width of the groove.

15. An automatic valve for relieving pressure from the interior of a pressurizable tank, comprising:
    an elongated rod slidably mounted in a central bore of the body member;
    an elongated body member adapted to be sealably mounted in the tank, the body member having an annular groove thereon;
    a cover member slidably mounted on the body member for axial movement and extending over the body member and adjacent the groove, the cover member including at least one vent opening;
    an O-ring rollably disposed in the groove and normally being in sealing engagement between the body member and the cover member;
    a spring operatively interposed between the body member and the cover member so as to yieldably urge the cover member toward the body member;
    whereby when pressure in the tank results in a force on the cover member exceeding the force of the spring, the cover member moves upwardly relative to the body member which causes the O-ring to roll along the groove until the O-ring is in abutment with an upper shoulder of the groove and thereafter any further upward movement of the cover member causes the cover member to slide over the O-ring thereby forming an annular passage between the O-ring and the cover member for allowing fluid to escape past the O-ring to relieve the pressure in the tank.

16. The valve of claim 5 wherein the O-ring has a circular cross section and the sliding of the cover member thereover causes the relief passage to have a variable cross-sectional area.

17. The valve of claim 15 further comprising a resiliently flexible seal member mounted below the cover member on a rod, the seal member normally sealingly engaging the cover member to close the vent opening and being deflectable away from the cover member to open the vent opening in response to a predetermined vacuum condition in the tank such that air can be drawn through the vent opening into the tank.

18. A method of relieving pressure through a valve having a body member with an O-ring rollably disposed in a groove thereon, the valve further including a cover member movably mounted on the body member and biased into sealing engagement with the O-ring in a tank, comprising:

moving the cover member with respect to the body member when the pressure in the tank acting on the cover member exceeds the biasing force so that the O-ring rolls in the groove until the O-ring abuts a shoulder at an end of the groove;

continuing to move the cover member so as to slide past the O-ring and thereby open a relief passage between the cover member and the O-ring.

19. The method of claim 18 further comprising when the pressure in the tank falls below the predetermined biasing force, moving the cover in an opposite direction so as to contact the O-ring and thereby close the relief passage.

20. The method of claim 18 wherein the valve includes a vent opening in the cover member and a resiliently flexible seal member normally in sealing engagement with the cover member over the vent opening and the method comprises:

opening the vent opening by suctioning the seal member out of sealing engagement with the cover member;

allowing outside air to be drawn through the vent opening until the negative pressure in the tank is equalized by the ambient pressure outside the tank.

21. The method of claim 20 further comprising closing the vent opening by allowing the seal member to resume sealing engagement with the cover member over the vent opening.

* * * * *